(12) United States Patent
Song et al.

(10) Patent No.: US 11,926,538 B2
(45) Date of Patent: Mar. 12, 2024

(54) WASTEWATER TREATMENT METHOD AND APPARATUS BASED ON HYDRATE-BASED WATER VAPOR ADSORPTION

(71) Applicant: DALIAN UNIVERSITY OF TECHNOLOGY, Liaoning (CN)

(72) Inventors: Yongchen Song, Liaoning (CN); Lunxiang Zhang, Liaoning (CN); Huilian Sun, Liaoning (CN); Zheng Ling, Liaoning (CN); Jiafei Zhao, Liaoning (CN); Lingjie Sun, Liaoning (CN); Lei Yang, Liaoning (CN); Mingjun Yang, Liaoning (CN); Yu Liu, Liaoning (CN); Weiguo Liu, Liaoning (CN); Yanghui Li, Liaoning (CN); Xiang Sun, Liaoning (CN); Lanlan Jiang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 0 days.

(21) Appl. No.: 18/315,484

(22) Filed: May 10, 2023

(65) Prior Publication Data

US 2023/0365430 A1    Nov. 16, 2023

(30) Foreign Application Priority Data

May 13, 2022    (CN) .......................... 202210516883.6

(51) Int. Cl.
 *C02F 1/04*    (2023.01)
 *B01D 1/30*    (2006.01)
 (Continued)

(52) U.S. Cl.
 CPC ................ *C02F 1/048* (2013.01); *B01D 1/30* (2013.01); *B01D 5/0006* (2013.01);
 (Continued)

(58) Field of Classification Search
 CPC .. C02F 1/048; C02F 2101/20; C02F 2103/16; C02F 2209/02; C02F 2209/03;
 (Continued)

(56) References Cited

U.S. PATENT DOCUMENTS 6,497,794 B1 *    12/2002    Max .......................... C02F 1/20
                                                                210/765
2002/0003111 A1 *    1/2002    Max .......................... C02F 1/20
                                                                210/703

(Continued)

FOREIGN PATENT DOCUMENTS

CN    110563240 A * 12/2019    ................ C02F 9/10

OTHER PUBLICATIONS

Search Abstract Data for CN-110563240-A obtained Jul. 28, 2023. (Year: 2023).*

*Primary Examiner* — Jonathan Miller
(74) *Attorney, Agent, or Firm* — JCIPRNET

(57) ABSTRACT

The present disclosure relates to the technical field of wastewater treatment, and provides a wastewater treatment method and apparatus based on hydrate-based water vapor adsorption. The apparatus includes a wastewater evaporation zone, a hydrate formation zone, a hydrate decomposition zone, and a data acquisition and control system. Rising water vapor and condensed water formed during evaporation of wastewater at normal temperature react with a hydrate former on a cooling wall surface to form a hydrate, continuous evaporation of the wastewater is promoted, the hydrate is scraped off to a collecting zone below by a scraper after being formed, and the hydrate is decomposed into fresh water, thereby realizing wastewater treatment. The present disclosure provides a method for treating complex wastewater containing a plurality of pollutants, where water vapor is consumed to form the hydrate to promote wastewater (Continued)

evaporation, and water obtained from the decomposition does not contain pollutants theoretically.

10 Claims, 1 Drawing Sheet

(51) Int. Cl.
*B01D 5/00* (2006.01)
*B01D 9/00* (2006.01)
*C02F 101/20* (2006.01)
*C02F 103/16* (2006.01)

(52) U.S. Cl.
CPC ............ *B01D 5/0051* (2013.01); *B01D 5/006* (2013.01); *B01D 9/0013* (2013.01); *B01D 9/0031* (2013.01); *C02F 2101/20* (2013.01); *C02F 2103/16* (2013.01); *C02F 2209/02* (2013.01); *C02F 2209/03* (2013.01)

(58) Field of Classification Search
CPC ........ B01D 1/30; B01D 5/006; B01D 5/0051; B01D 9/0013; B01D 9/0031
See application file for complete search history.

(56) References Cited

U.S. PATENT DOCUMENTS

| | | | |
|---|---|---|---|
| 2002/0155047 A1* | 10/2002 | Max .................... | C02F 1/265 |
| | | | 422/245.1 |
| 2003/0024803 A1* | 2/2003 | Max .................... | C02F 1/22 |
| | | | 203/10 |
| 2020/0377382 A1* | 12/2020 | Mahajan ............... | C02F 1/265 |
| 2022/0169535 A1* | 6/2022 | Lee ....................... | C02F 1/28 |

* cited by examiner

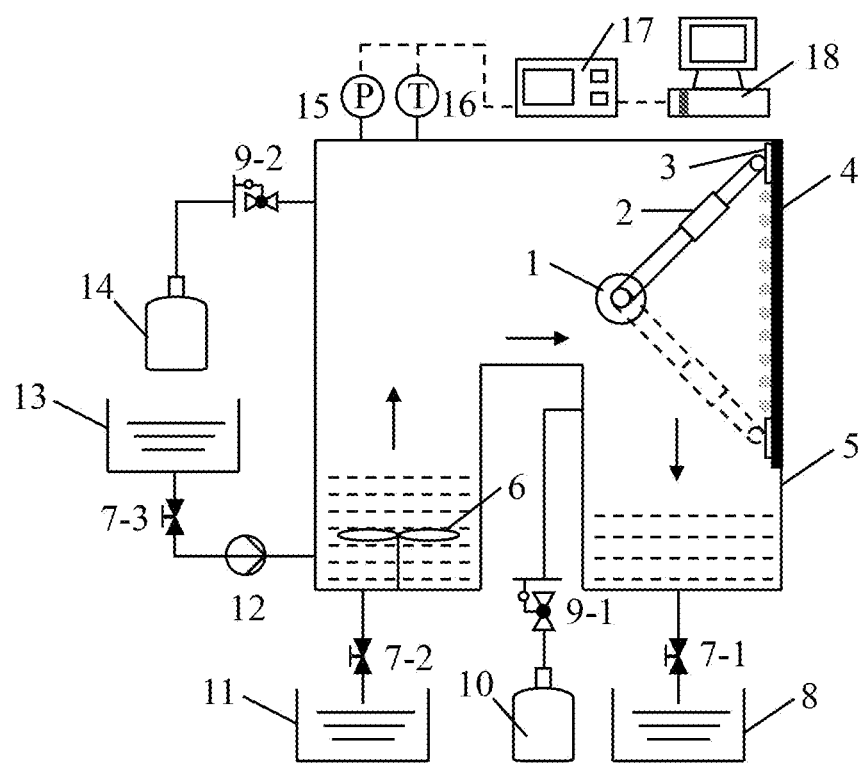

WASTEWATER TREATMENT METHOD AND APPARATUS BASED ON HYDRATE-BASED WATER VAPOR ADSORPTION

CROSS-REFERENCE TO RELATED APPLICATION

This application claims the priority benefit of China application serial no. 202210516883.6, filed on May 13, 2022. The entirety of the above-mentioned patent application is hereby incorporated by reference herein and made a part of this specification.

BACKGROUND

Technical Field

The present disclosure belongs to the field of wastewater treatment, and specifically relates to a wastewater treatment method and apparatus based on hydrate-based water vapor adsorption.

Description of Related Art

In recent years, with the high-speed development of the economy and the acceleration of the industrialization process, wastewater discharge is continuously increasing, and wastewater discharge has become an important obstacle to the construction of ecological civilization in China. Annual wastewater discharge in China reaches 70 billion tons in average, where the annual discharge of industrial wastewater exceeds 20 billion tons in average, accounting for about 30% of the total wastewater discharge. Industrial wastewater has the characteristics such as high pollution and being difficult to treat, and the industrial wastewater is rich in various pollutants such as inorganic heavy metals, organic phenols, and light hydrocarbons, greatly increasing the difficulty of wastewater treatment. Untreated wastewater discharged to nearby rivers and oceans not only causes serious environmental pollution problems, but also affects daily production and life of people. Therefore, the wastewater treatment technology is of great significance for economic development and ecological protection in China.

At present, industrial wastewater treatment technologies mainly include a chemical precipitation method, an electrolysis method, a membrane separation method, an evaporation method, and the like. However, the chemical precipitation method has the problems of large dosage, secondary pollution, and the like. The electrolysis method requires high treatment costs, and is not suitable for large-scale wastewater treatment. The membrane separation method has high requirements on the water quality of wastewater, and the wastewater treatment costs are increased due to the blockage of the membrane. The evaporation method requires high energy consumption, leading to very high wastewater treatment costs. The conventional wastewater treatment technologies suffer from the problems of high energy consumption, secondary pollution, high costs, and the like, and are not suitable for the treatment of complex wastewater containing various pollutants. Therefore, there is an urgent need to explore a novel environment-friendly, efficient, and universal wastewater treatment technology.

To solve the defects of the conventional industrial wastewater treatment technologies, the present disclosure provides a wastewater treatment method based on hydrate-based water vapor adsorption by using a hydrate process.

SUMMARY

In view of the defects of high energy consumption, secondary pollution, and high costs of the conventional wastewater treatment technologies, an objective of the present disclosure is to provide a wastewater treatment method and apparatus based on hydrate-based water vapor adsorption, in order to effectively solve the problems of high energy consumption and low efficiency of the conventional wastewater treatment technologies, achieve continuous wastewater treatment, improve the production efficiency, recycle the used gaseous hydrate former through collection and purification, and reduce the wastewater treatment costs. Specific technical solutions are as follows.

A wastewater treatment apparatus based on hydrate-based water vapor adsorption is provided, including: a wastewater evaporation zone, a hydrate formation zone, a hydrate decomposition zone, and a data acquisition and control system, where
  the wastewater evaporation zone includes a reactor, a magnetic stirrer, a waste liquid tank, and a wastewater storage tank; the reactor is divided into a wastewater evaporation chamber and a hydrate formation and decomposition chamber; an upper part of the wastewater evaporation chamber is communicated with an upper part of the hydrate formation and decomposition chamber; the wastewater storage tank is connected to the wastewater evaporation chamber of the reactor; the magnetic stirrer is arranged in the wastewater evaporation chamber; a bottom of the wastewater evaporation chamber is connected to the waste liquid tank;
  the hydrate formation zone includes a wall scraping device, a cooling wall surface, a gas cylinder, a pressure sensor, and a temperature sensor; the gas cylinder is connected to the reactor; the pressure sensor and the temperature sensor are arranged in the reactor to monitor a reaction environment in the hydrate formation and decomposition chamber; the wall scraping device is arranged in the reactor to act on the cooling wall surface and is configured to scrape off a hydrate crystal formed by water vapor and condensed water of the water vapor with a gaseous hydrate former on the cooling wall surface;
  the hydrate decomposition zone includes the hydrate formation and decomposition chamber of the reactor, a fresh water tank, and a gas recovery device; the hydrate crystal scraped off by the wall scraping device falls to a bottom of the hydrate formation and decomposition chamber of the reactor; the gas recovery device is connected to the hydrate formation and decomposition chamber and is configured to collect the gaseous hydrate former after decomposition of the hydrate crystal to achieve recycling of the gaseous hydrate former; the fresh water tank is connected to the bottom of the hydrate formation and decomposition chamber and is configured to collect fresh water after the decomposition of the hydrate;
  the data acquisition and control system includes a data acquisition device and a computer control system; the pressure sensor and the temperature sensor in the reactor are connected to the data acquisition device to detect pressure and temperature changes in a wastewater treatment process inside the reactor; and the computer control system is configured to control a wall scraping motion of the wall scraping device and a temperature adjustment of the cooling wall surface.

Further, the wall scraping device includes a motor, a telescopic rod, and a scraper; the motor is mounted in the reactor and is connected to the telescopic rod to control the scraper to move on an inner wall of the reactor; and a length of the telescopic rod is adjustable according to a position change, so that the scraper vertically moves along the cooling wall surface and scrapes off the hydrate crystal formed by the water vapor and the condensed water of the water vapor with the gaseous hydrate former on the cooling wall surface.

Further, the cooling wall surface is cooled by a cooling coil pipe to form a wall surface environment suitable for hydrate formation.

Further, a main body part of the reactor is made of stainless steel and is configured for bearing a pressure of 10 MPa.

Further, an outer sidewall of the reactor corresponding to the cooling coil pipe is made of a high-pressure-resistant thermal insulation material having a thermal conductivity of less than 0.25 W/(m·K) to connect to other outer sidewall surfaces, to reduce a loss of cold energy.

A method of using the wastewater treatment apparatus based on the hydrate-based water vapor adsorption is provided, including the following treatment steps:

step 1: wastewater intake: conveying wastewater in the wastewater storage tank into the reactor until a volume of the wastewater conveyed reaches a volume of wastewater to be treated in one batch;

step 2: gas introduction: introducing the gaseous hydrate former at a high pressure in the gas cylinder into the reactor until a pressure in the reactor reaches a pressure required for wastewater treatment;

step 3: reaction: reducing a temperature of the cooling wall surface to a temperature required for the reaction, and turning on the magnetic stirrer to accelerate an evaporation of the wastewater; rising the water vapor and the condensed water formed during the evaporation reacting with the gaseous hydrate former to form a hydrate as a solid on the cooling wall surface, and promoting a continuous evaporation of the wastewater by consuming the water vapor through the reaction;

step 4: separation: as the hydrate crystal formed on the cooling wall surface continuously accumulates and thickens, turning on the wall scraping device to scrape off the hydrate crystal formed on the cooling wall surface; periodically turning on and off the wall scraping device by the computer control system to periodically scrape off the hydrate crystal formed on the cooling wall surface until one batch of the wastewater treatment is completed;

step 5: decomposition: the hydrate crystal which is scraped off the cooling wall surface falling to the bottom of the hydrate formation and decomposition chamber of the reactor, and the hydrate being rapidly decomposed into a gas and fresh water at normal temperature; collecting the gas released from the decomposition of the hydrate to the gas recovery device, and recycling the gas after purification; the fresh water obtained through the decomposition of the hydrate flowing to the fresh water tank; conveying remaining concentrated wastewater at the bottom of the wastewater evaporation chamber of the reactor to the waste liquid tank; and step 6: cycling: after the hydrate is completely decomposed, i.e., the one batch of the wastewater treatment is completed, closing all valves, and repeating the steps 1 to 5 to realize continuous wastewater treatment.

Further, the gaseous hydrate former is a gas molecule that generates a hydrate phase equilibrium pressure of 0.1 MPa to 10 MPa at a reaction temperature of 2° C. to 8° C.

Further, the gaseous hydrate former is one or both of carbon dioxide and propane.

Further, the wastewater conveyed into the reactor for the wastewater treatment is complex wastewater containing a plurality of pollutants, a temperature of the wastewater is 20° C. to 25° C., a flow rate of the wastewater is controlled at 1.0 m/s to 3.0 m/s, and the volume of the wastewater conveyed is 70% to 80% of a volume of the wastewater evaporation zone of the reactor.

Further, a stirring speed of the magnetic stirrer is controlled at 400 rpm to 800 rpm to increase a speed of the evaporation of the wastewater; the temperature of the cooling wall surface is adjusted according to a concentration of the wastewater treated, and the temperature is controlled at 2° C. to 8° C., the temperature and the pressure are controlled to be above a hydrate phase equilibrium curve; and the gaseous hydrate former and the water vapor formed during the evaporation form the hydrate on the cooling wall surface to promote the continuous evaporation of the wastewater in the wastewater evaporation zone.

The motor is controlled by the computer control system. On/off of the motor is controlled according to a growth speed of the hydrate on the cooling wall surface. The motor controls the telescopic rod and the scraper to periodically scrape off the formed hydrate into a collecting zone below the reactor. The hydrate is decomposed at normal temperature to obtain fresh water.

The present disclosure has the following advantages. In the method of the present disclosure, the wastewater is treated through the hydrate-based water vapor adsorption. The gaseous hydrate former reacts with water vapor and condensed water to form a hydrate, so that the partial pressure of water vapor in the apparatus is reduced, to promote the continuous evaporation of the wastewater. The hydrate is decomposed to obtain fresh water. Thereby, the wastewater treatment is achieved, and the problems of high energy consumption of the heating evaporation method and low pollutant removal efficiency of the hydrate process due to entrained wastewater in conventional technologies are solved. The method is suitable for the treatment of various wastewater including high-concentration complex wastewater, and the fresh water obtained after the decomposition theoretically does not contain pollutants. In addition, after the wastewater treatment is completed, the gaseous hydrate former released by the decomposition of the hydrate can be recycled after being collected, thereby reducing the wastewater treatment costs and improving the cost-effectiveness of the treatment.

BRIEF DESCRIPTION OF THE DRAWINGS

FIGURE is a schematic diagram of a wastewater treatment method and apparatus based on hydrate-based water vapor adsorption.

DESCRIPTION OF THE EMBODIMENTS

Specific implementations of the present disclosure are described in detail below in conjunction with the accompanying drawings and technical solutions.

Example 1

A wastewater treatment system based on hydrate-based water vapor adsorption includes a wastewater evaporation zone, a hydrate formation zone, a hydrate decomposition zone, and a data acquisition and control system.

The wastewater evaporation zone includes a reactor 5, a magnetic stirrer 6, a second one-way valve 7-2, a third one-way valve 7-3, a waste liquid tank 11, a water pump 12, and a wastewater storage tank 13. The wastewater storage tank 13 is connected to the reactor 5 through the third one-way valve 7-3 and the water pump 12. The magnetic stirrer 6 is arranged in the reactor. A bottom of the reactor is connected to the waste liquid tank 11 through the second one-way valve 7-2.

The hydrate formation zone includes a motor 1, a telescopic rod 2, a scraper 3, a cooling coil pipe 4, a second pressure reducing valve 9-2, a gas cylinder 14, a pressure sensor 15, and a temperature sensor 16. The motor 1 is mounted in the reactor 5, and is connected to the telescopic rod 2 to control the scraper 3 to move on a cooling wall surface. A length of the telescopic rod 2 is adjustable according to a position change, so that the scraper 3 vertically moves along the cooling wall surface and scrapes off the hydrate crystal formed by the water vapor and the condensed water of the water vapor with the gaseous hydrate former on the cooling wall surface corresponding to the cooling coil pipe 4. The gas cylinder 14 is connected to the reactor 5 through the second pressure reducing valve 9-2. The pressure sensor 15 and the temperature sensor 16 are arranged in the reactor 5 to monitor a reaction environment in the reactor.

The hydrate decomposition zone includes the reactor 5, a first one-way valve 7-1, a fresh water tank 8, a first pressure reducing valve 9-1, and a gas recovery device 10. The hydrate crystal scraped off by the scraper 3 falls into a collecting zone below the reactor 5. The gas recovery device 10 is connected to the reactor 5 through the first pressure reducing valve 9-1, and is configured to collect the gaseous hydrate former obtained by decomposition of the hydrate crystal, to realize the recycling of the gaseous hydrate former. The fresh water tank 8 is connected to the bottom of the reactor 5 through the first one-way valve 7-1 and is configured to collect fresh water obtained by the decomposition of the hydrate.

The data acquisition and control system includes a data acquisition device 17 and a computer control system 18. The pressure sensor 15 and the temperature sensor 16 in the reactor are connected to the data acquisition device 17 to detect pressure and temperature changes in a wastewater treatment process inside the reactor. The computer control system 18 controls the motor 1 to be turned on/off at regular intervals to drive the telescopic rod 2 and the scraper 3 to periodically move.

In this example, a method of using the wastewater treatment apparatus based on the hydrate-based water vapor adsorption includes the following steps.

The water pump 12 is turned on and the third one-way valve 7-3 is opened. Wastewater stored in the wastewater storage tank 13 is high-concentration copper-containing wastewater discharged by an electroplating plant, with an ion concentration of about 15000 mg/L. The heavy metal wastewater is conveyed into the reactor 5 through the water pump 12. The temperature of the wastewater is 20° C. The flow rate of the wastewater is 2.0 m/s. The volume of wastewater conveyed is 75% of the volume of the wastewater evaporation zone of the reactor 5. After the wastewater intake is complete, the water pump 12 is turned off and the third one-way valve 7-3 is closed. The second pressure reducing valve 9-2 is opened. Carbon dioxide is used as the gaseous hydrate former. A high-pressure gas in the gas cylinder 14 is introduced into the reactor 5 through the pressure reducing valve. The gas pressure in the reactor is controlled at 3.5 MPa, to prevent gas liquefaction. After the gas introduction is complete, the second pressure reducing valve 9-2 is closed.

The temperature of the cooling coil pipe 4 is reduced, and the reaction temperature is set to 3° C. The magnetic stirrer 6 is turned on, with a stirring speed of 600 rpm. The wastewater in the wastewater evaporation zone is continuously evaporated. Rising water vapor and condensed water formed during evaporation react with the gaseous hydrate former on the cooling wall surface to form a hydrate as a solid, and the evaporation of the wastewater is promoted by consuming the water vapor through reaction.

The hydrate crystal formed on the cooling wall surface continuously accumulates and thickens. The motor 1 is turned on. Under the action of the motor 1, the telescopic rod 2 drives the scraper 3 to vertically move from top to bottom along the cooling wall surface. The formed hydrate crystal is scraped off. The telescopic rod 2 returns to an initial position after separation. The computer control system 18 controls the motor 1 to be turned on/off at regular intervals. The motor 1 is turned on once every 10 minutes. The telescopic rod 2 drives the scraper 3 to periodically separate the hydrate crystal formed on the cooling wall surface until one batch of wastewater treatment is completed.

The hydrate crystal which is scraped off the cooling wall surface falls to the bottom of the reactor 5, and the hydrate is rapidly decomposed into a gas and fresh water at 20° C. The first pressure reducing valve 9-1 is opened, and carbon dioxide gas released by the decomposition of the hydrate is collected into the gas recovery device 10. The first one-way valve 7-1 is opened, and the fresh water formed by the decomposition of the hydrate crystal flows into the fresh water tank 8 through the valve. The flow rate of the fresh water is 1.5 m/s, and the ion concentration of the fresh water is less than 0.1 mg/L and is lower than a limit of detection, thereby effectively realizing wastewater purification. The second one-way valve 7-2 is opened, and the remaining concentrated wastewater is conveyed to the waste liquid tank 11 through the valve. The flow rate of the wastewater is 2.0 m/s, and the ion concentration of the wastewater is about 28000 mg/L. The concentrated heavy metal wastewater is treated by an electrolysis process to realize recovery of heavy metal resources. After the hydrate is completely decomposed, i.e., one wastewater treatment cycle is complete, all valves are closed, and the steps are repeated to realize continuous wastewater treatment.

Example 2

In this example, a method of using the wastewater treatment apparatus based on the hydrate-based water vapor adsorption includes the following steps.

The water pump 12 is turned on and the third one-way valve 7-3 is opened. Wastewater stored in the wastewater storage tank 13 is complex wastewater containing inorganic salts and organic pollutants discharged by a petroleum refinery plant, with a total organic carbon content of 187.7 mg/L and a sodium ion concentration of 2248.0 mg/L. The petroleum industry wastewater is conveyed into the reactor 5 through the water pump 12. The temperature of the wastewater is 25° C. The flow rate of the wastewater is 2.0 m/s. The volume of wastewater conveyed is 70% of the volume of the wastewater evaporation zone of the reactor 5. After the wastewater intake is complete, the water pump 12 is turned off and the third one-way valve 7-3 is closed. The second pressure reducing valve 9-2 is opened. Propane is used as the gaseous hydrate former. A high-pressure gas in the gas cylinder 14 is introduced into the reactor 5 through a pressure reducing valve. The gas pressure in the reactor is controlled at 0.5 MPa, to prevent propane liquefaction. After the gas introduction is complete, the second pressure reducing valve 9-2 is closed.

The temperature of the cooling coil pipe 4 is reduced, and the reaction temperature is set to 4° C. The magnetic stirrer 6 is turned on, with a stirring speed of 500 rpm. The wastewater in the wastewater evaporation zone is continuously evaporated. Rising water vapor and condensed water formed during evaporation react with the gaseous hydrate former on the cooling wall surface to form a hydrate as a solid, and the evaporation of the wastewater is promoted by consuming the water vapor through reaction.

The hydrate crystal formed on the cooling wall surface continuously accumulates and thickens. The motor 1 is turned on. Under the action of the motor 1, the telescopic rod 2 drives the scraper 3 to vertically move from top to bottom along the cooling wall surface. The formed hydrate crystal is scraped off. The telescopic rod 2 returns to an initial position after separation. The computer control system 18 controls the motor 1 to be turned on/off at regular intervals. The motor 1 is turned on once every 15 minutes. The telescopic rod 2 drives the scraper 3 to periodically separate the hydrate crystal formed on the cooling wall surface until one batch of wastewater treatment is completed.

The hydrate crystal which is scraped off the cooling wall surface falls to the bottom of the reactor 5, and the hydrate is rapidly decomposed into a gas and fresh water at 25° C. The first pressure reducing valve 9-1 is opened, and carbon dioxide gas released by the decomposition of the hydrate is collected into the gas recovery device 10. The first one-way valve 7-1 is opened, and the fresh water formed by the decomposition of the hydrate crystal flows into the fresh water tank 8 through a valve. The flow rate of the fresh water is 1.5 m/s, the total organic carbon content of the fresh water is reduced to 13.4 mg/L, and the ion concentration of the fresh water is less than 0.1 mg/L and is lower than a limit of detection, thereby effectively realizing wastewater purification. The second one-way valve 7-2 is opened, and the remaining concentrated wastewater is conveyed to the waste liquid tank 11 through the valve. The flow rate of the wastewater is 2.0 m/s. After the hydrate is completely decomposed, i.e., one wastewater treatment cycle is complete, all valves are closed, and the steps are repeated to realize continuous wastewater treatment.

The above examples are one of the specific implementations of the present disclosure. The wastewater treatment method and apparatus based on hydrate-based water vapor adsorption of the present disclosure are not limited to the apparatus design structure and implementation steps described in the above examples, and any simple modification or equivalent transformation and combination made by a person skilled in the art based on the scope of the technical solutions of the present disclosure shall fall within the protection scope of the present disclosure.

What is claimed is:

1. A wastewater treatment apparatus based on hydrate-based water vapor adsorption, comprising: a wastewater evaporation zone, a hydrate formation zone, a hydrate decomposition zone, and a data acquisition and control system, wherein the wastewater evaporation zone comprises a reactor, a magnetic stirrer, a waste liquid tank, and a wastewater storage tank; the reactor is divided into a wastewater evaporation chamber and a hydrate formation and decomposition chamber; an upper part of the wastewater evaporation chamber is communicated with an upper part of the hydrate formation and decomposition chamber; the wastewater storage tank is connected to the wastewater evaporation chamber of the reactor; the magnetic stirrer is arranged in the wastewater evaporation chamber; a bottom of the wastewater evaporation chamber is connected to the waste liquid tank;

the hydrate formation zone comprises a wall scraping device, a cooling wall surface, a gas cylinder, a pressure sensor, and a temperature sensor; the gas cylinder is connected to the reactor; the pressure sensor and the temperature sensor are arranged in the reactor to monitor a reaction environment in the hydrate formation and decomposition chamber; the wall scraping device is arranged in the reactor to act on the cooling wall surface and is configured to scrape off a hydrate crystal formed by water vapor and condensed water of the water vapor with a gaseous hydrate former on the cooling wall surface;

the hydrate decomposition zone comprises the hydrate formation and decomposition chamber of the reactor, a fresh water tank, and a gas recovery device; the hydrate crystal scraped off by the wall scraping device falls to a bottom of the hydrate formation and decomposition chamber of the reactor; the gas recovery device is connected to the hydrate formation and decomposition chamber and is configured to collect the gaseous hydrate former after decomposition of the hydrate crystal to achieve recycling of the gaseous hydrate former; the fresh water tank is connected to the bottom of the hydrate formation and decomposition chamber and is configured to collect fresh water after the decomposition of the hydrate crystal; and the data acquisition and control system comprises a data acquisition device and a computer control system; the pressure sensor and the temperature sensor in the reactor are connected to the data acquisition device to detect pressure and temperature changes in a wastewater treatment process inside the reactor; and the computer control system controls a wall scraping motion of the wall scraping device and a temperature adjustment of the cooling wall surface.

2. The wastewater treatment apparatus based on the hydrate-based water vapor adsorption according to claim 1, wherein the wall scraping device comprises a motor, a telescopic rod, and a scraper; the motor is mounted in the reactor and is connected to the telescopic rod to control the scraper to move on an inner wall of the reactor; and a length of the telescopic rod is adjustable according to a position change, so that the scraper vertically moves along the cooling wall surface and scrapes off the hydrate crystal formed by the water vapor and the condensed water of the water vapor with the gaseous hydrate former on the cooling wall surface.

3. The wastewater treatment apparatus based on the hydrate-based water vapor adsorption according to claim 1, wherein the cooling wall surface is cooled by a cooling coil pipe to form a wall surface environment suitable for hydrate formation.

4. The wastewater treatment apparatus based on the hydrate-based water vapor adsorption according to claim 1, wherein a main body part of the reactor is made of stainless steel and is configured for bearing a pressure of 10 MPa.

5. The wastewater treatment apparatus based on the hydrate-based water vapor adsorption according to claim 3, wherein an outer sidewall of the reactor corresponding to the cooling coil pipe is made of a high-pressure-resistant thermal insulation material having a thermal conductivity of less than 0.25 W/(m·K) to connect to other outer sidewall surfaces, to reduce a loss of cold energy.

6. A method of using the wastewater treatment apparatus based on the hydrate-based water vapor adsorption according to claim 1, comprising the following steps:

step 1: wastewater intake: conveying wastewater in the wastewater storage tank into the reactor until a volume of the wastewater conveyed reaches a volume of wastewater to be treated in one batch;

step 2: gas introduction: introducing the gaseous hydrate former at a high pressure in the gas cylinder into the reactor until a pressure in the reactor reaches a pressure required for wastewater treatment;

step 3: reaction: reducing a temperature of the cooling wall surface to a temperature required for the reaction, and turning on the magnetic stirrer to accelerate an evaporation of the wastewater; rising the water vapor and the condensed water formed during the evaporation reacting with the gaseous hydrate former to form a hydrate crystal as a solid on the cooling wall surface, and promoting a continuous evaporation of the wastewater by consuming the water vapor through the reaction;

step 4: separation: as the hydrate crystal formed on the cooling wall surface continuously accumulates and thickens, turning on the wall scraping device to scrape off the hydrate crystal formed on the cooling wall surface; periodically turning on and off the wall scraping device by the computer control system to periodically scrape off the hydrate crystal formed on the cooling wall surface until one batch of the wastewater treatment is completed;

step 5: decomposition: the hydrate crystal which is scraped off falling to the bottom of the hydrate formation and decomposition chamber of the reactor, and the hydrate crystal being rapidly decomposed into a gas and fresh water at normal temperature; collecting the gas released from the decomposition of the hydrate crystal to the gas recovery device, and recycling the gas after purification; the fresh water obtained through the decomposition of the hydrate crystal flowing to the fresh water tank; conveying remaining concentrated wastewater at the bottom of the wastewater evaporation chamber of the reactor to the waste liquid tank; and step 6: cycling: after the hydrate crystal is completely decomposed, the one batch of the wastewater treatment is completed, closing all valves, and repeating the steps 1 to 5 to realize continuous wastewater treatment.

7. The method according to claim 6, wherein the gaseous hydrate former is a gas molecule that generates a hydrate phase equilibrium pressure of 0.1 MPa to 10 MPa at a reaction temperature of 2° C. to 8° C.

8. The method according to claim 6, wherein the gaseous hydrate former is one or both of carbon dioxide and propane.

9. The method according to claim 6, wherein the wastewater conveyed into the reactor for the wastewater treatment is complex wastewater containing a plurality of pollutants, a temperature of the wastewater is 20° C. to 25° C., a flow rate of the wastewater is controlled at 1.0 m/s to 3.0 m/s, and the volume of the wastewater conveyed is 70% to 80% of a volume of the wastewater evaporation zone of the reactor.

10. The method according to claim 6, wherein a stirring speed of the magnetic stirrer is controlled at 400 rpm to 800 rpm to increase a speed of the evaporation of the wastewater; the temperature of the cooling wall surface is adjusted according to a concentration of the wastewater treated, and the temperature is controlled at 2° C. to 8° C., the temperature and the pressure are controlled to be above a hydrate phase equilibrium curve; and the gaseous hydrate former and the water vapor formed during the evaporation form the hydrate crystal on the cooling wall surface to promote the continuous evaporation of the wastewater in the wastewater evaporation zone.

* * * * *